US008971444B2

(12) United States Patent
Kumar

(10) Patent No.: US 8,971,444 B2
(45) Date of Patent: Mar. 3, 2015

(54) GENERALIZED FREQUENCY MODULATION

(76) Inventor: Rajendra Kumar, Cerritos, CA (US)

( * ) Notice: Subject to any disclaimer, the term of this patent is extended or adjusted under 35 U.S.C. 154(b) by 893 days.

(21) Appl. No.: 12/536,078

(22) Filed: Aug. 5, 2009

(65) Prior Publication Data

US 2011/0033003 A1 Feb. 10, 2011

(51) Int. Cl.
*H04K 1/02* (2006.01)
*H03K 7/06* (2006.01)
*H04L 27/12* (2006.01)
*H04L 27/156* (2006.01)

(52) U.S. Cl.
CPC .............. *H04L 27/12* (2013.01); *H04L 27/156* (2013.01)
USPC .......................................... 375/296; 275/239

(58) Field of Classification Search
USPC ......... 375/295, 296, 297, 259, 271, 285, 302, 375/239; 455/91, 114.2, 114.3; 332/117
See application file for complete search history.

(56) References Cited

U.S. PATENT DOCUMENTS

| 4,434,440 | A | * | 2/1984 | Schiff | 348/723 |
|---|---|---|---|---|---|
| 4,809,005 | A | | 2/1989 | Counselman, III | |
| 6,031,418 | A | | 2/2000 | Fowler | |
| 6,771,721 | B1 | * | 8/2004 | Rostamy et al. | 375/346 |
| 7,986,195 | B2 | * | 7/2011 | Ramirez | 332/119 |
| 8,036,625 | B1 | | 10/2011 | Clement | |
| 8,107,013 | B2 | | 1/2012 | Kim et al. | |
| 2005/0054307 | A1 | * | 3/2005 | Watts et al. | 455/127.3 |
| 2006/0230089 | A1 | | 10/2006 | Scott et al. | |
| 2008/0285761 | A1 | * | 11/2008 | Mano et al. | 381/3 |
| 2012/0224658 | A1 | | 9/2012 | Kumar | |

OTHER PUBLICATIONS

Kumar, Rajendra, "Analysis of FM Demodulator Output Noise with Applications to the Space Lift Range System," 2006 IEEE Aerospace Conference, 0-7803-9546-08/06, 2006.
Kumar, Rajendra, "Analysis of FM Demodulator Output Noise with Applications to FM Telemetry," Journal of Applied Mathematics and Decision Sciences, vol. 2006, Article ID 53649, pp. 1-13, Hindawi Publishing Corporation, 2006.
Non-Final Office Action mailed Dec. 11, 2012 in U.S. Appl. No. 13/465,606.
Couch II, Leon W., "Digital and Analog Communication Systems," seventh edition, Prentice Hall, ISBN 0-13-142492-0, p. 319 (2007).

(Continued)

*Primary Examiner* — Vineeta Panwalkar
(74) *Attorney, Agent, or Firm* — K&L Gates LLP

(57) ABSTRACT

A receiver may comprise a complex mixer for converting the modulated signal to a complex modulated signal comprising a first in-phase component and a first quadrature component. The receiver may further comprise a digital demodulator. The digital demodulator may comprise at least one processor circuit programmed for applying a phase differencer for generating an output function in terms of a phase difference of the complex modulated signal. Applying the phase differencer may comprise converting the first in-phase component to a function of a phase difference of the first in-phase component expressed in digital time, and converting the first quadrature component to a function of the phase difference of the first quadrature component expressed in digital time. The at least one processor circuit of the digital demodulator may also be programmed for applying a four quadrant inverse tangent to the output function to generate the information signal.

6 Claims, 5 Drawing Sheets

(56) References Cited

OTHER PUBLICATIONS

Gibson, Jerry D., "Principles of Digital and Analog Communications," Macmillan Publishing Company, ISBN 0-02-341780-3, p. 154 (1989).

Notice of Allowance, U.S. Appl. No. 13/465,606, Sep. 24, 2013 (13 pages).

Notice of Allowance, U.S. Appl. No. 13/465,606, Jun. 28, 2013 (12 pages).

* cited by examiner

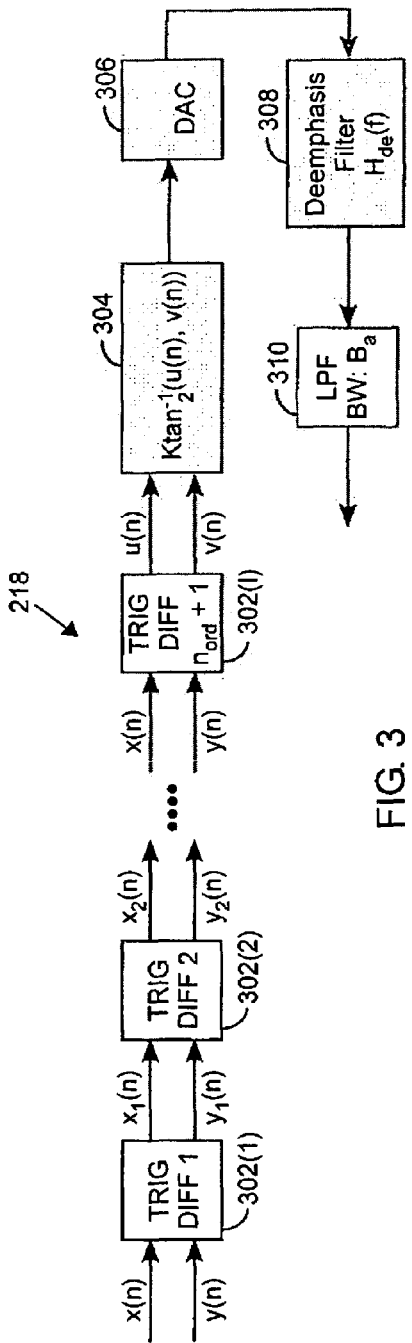
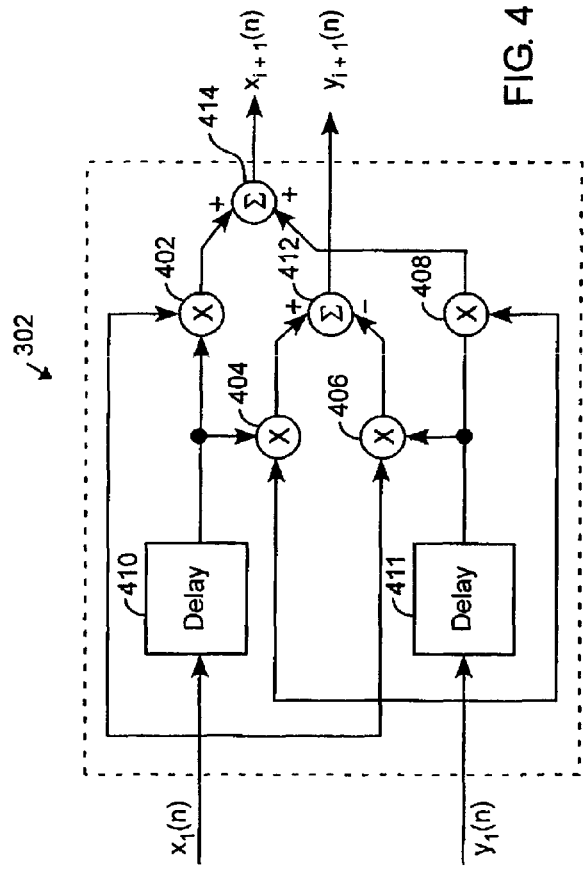
FIG. 3
FIG. 4

US 8,971,444 B2

GENERALIZED FREQUENCY MODULATION

STATEMENT OF GOVERNMENT INTEREST

This invention was made with Government support under contract number FA8802-04-C-0001 by the Department of the United States Air Force. The government has certain rights in the invention.

BACKGROUND

Frequency Modulation (FM) and Phase Modulation (PM) are two types of analog modulation that are used in various telecommunication and other settings. In FM schemes, an information signal is represented by varying the frequency of a carrier signal. The resulting modulated signal can later be de-modulated (e.g., after transmission) to reconstruct the information signal. According to PM schemes, the information signal is represented by varying the phase of the carrier signal. Because both FM and PM modify angular characteristics of the carrier signal, they generate modulated signals having constant signal envelopes. This makes FM and PM signals less susceptible to noise than other analog modulation techniques, such as Amplitude Modulation (AM). Nonetheless, FM and PM modulated signals are still susceptible to noise including, for example, noise due to channel fading, nonlinear power amplifier characteristics, receiver noise, co-channel interference, adjacent channel interference, etc.

One particular difficulty encountered with FM and PM modulated signals is phase wrapping. For example, FM and PM modulated signals are often demodulated by applying the four quadrant arctangent ($\tan_2^{-1}$) to the complex representation of the modulated signal, providing the phase. Because the result of the four quadrant arctangent is limited to the range $(\pi, -\pi)$, however, phase signals found using the four quadrant arctangent exhibit discontinuities in applications where the phase varies continuously over a range exceeding $(\pi, -\pi)$. The discontinuities are equal to integer multiples of $2\pi$ and occur at those time instances when the phase is an odd multiple of $\pi$. In order to generate the correct phase, the discontinuities must be removed. In FM schemes, the frequency of the modulated signal is often found by differentiating the phase result of the four quadrant arctangent to provide frequency. After differentiation, the discontinuities in phase manifest as impulse signals in frequency, which are then removed in subsequent processing. In the presence of noise, it can be very difficult to adequately compensate for discontinuities in phase and/or impulses in frequency.

SUMMARY

Various embodiments are directed to systems, apparatuses and methods for a modulation scheme that may have improved noise characteristics. For example, various embodiments may facilitate modulation schemes based on derivatives of the carrier phase.

FM and higher orders of phase modulation may be implemented by applying cascaded integrators at the transmitter/modulator and cascaded differentiators or differencers at the receiver/demodulator. The number of cascaded integrators and/or differentiators may correspond to the order of the phase derivative being used as well as the order of the transmitter/modulator or receiver/demodulator.

FIGURES

Various embodiments of the present invention are described here by way of example in conjunction with the following figures, wherein:

FIG. 3 illustrates the GFM demodulator of the receiver of FIG. 2 according to one embodiment of the present invention.

FIG. 4 illustrates a trigonometric differencing block of the demodulator of FIG. 3 according to one embodiment of the present invention.

DESCRIPTION

Various embodiments are directed to systems, apparatuses and methods for a generalized frequency modulation (GFM) scheme having improved noise characteristics. For example, various embodiments may facilitate modulation schemes based on derivatives of the carrier phase. Performing modulation by varying derivatives of the carrier phase may lead to improved noise performance relative to straight PM. For example, the signal-to-noise power ratio (SNR) of a demodulated standard frequency modulated (SFM) signal is higher than that of a comparable PM signal by about 4.7 dB. This is because frequency is the derivative of phase. Accordingly, SFM is a second order example of PM. Additional increases in SNR may be achieved by varying higher order derivatives of the carrier phase with the information signal m(t). Phase-wrapping problems, however, hamper the implementation of FM and make it difficult to implement higher orders of phase modulation.

Various embodiments may implement FM and higher orders of phase modulation by applying cascaded integrators at the transmitter/modulator and cascaded differentiators or differencers at the receiver/demodulator. In this way, known modulation and demodulation techniques based on phase (e.g., the four quadrant arctangent) may be used. The number of cascaded integrators and/or differentiators may correspond to the order of the phase derivative being used as well as the order of the transmitter/modulator or receiver/demodulator.

To avoid phase-wrapping, various embodiments may comprise a digitally-implemented demodulator unit that applies its differentiators or differencers prior to applying the four quadrant arctangent. The differencers themselves may be trigonometric differencers, as described below, configured to provide as output an instantaneous phase difference of the modulated signal. Accordingly, instead of being applied to the phase signal itself, the four quadrant arctangent may be applied only to the instantaneous phase difference of the modulated signal. In a digital setting the instantaneous phase difference may correspond to the difference in the phase signal between consecutively sampled values of the phase. Because the digital sampling rate is usually relatively high compared to the bandwidth of the modulated signal, the phase differences are typically smaller than $\pi$, thereby minimizing or eliminating phase-wrapping discontinuities.

Figure 1:
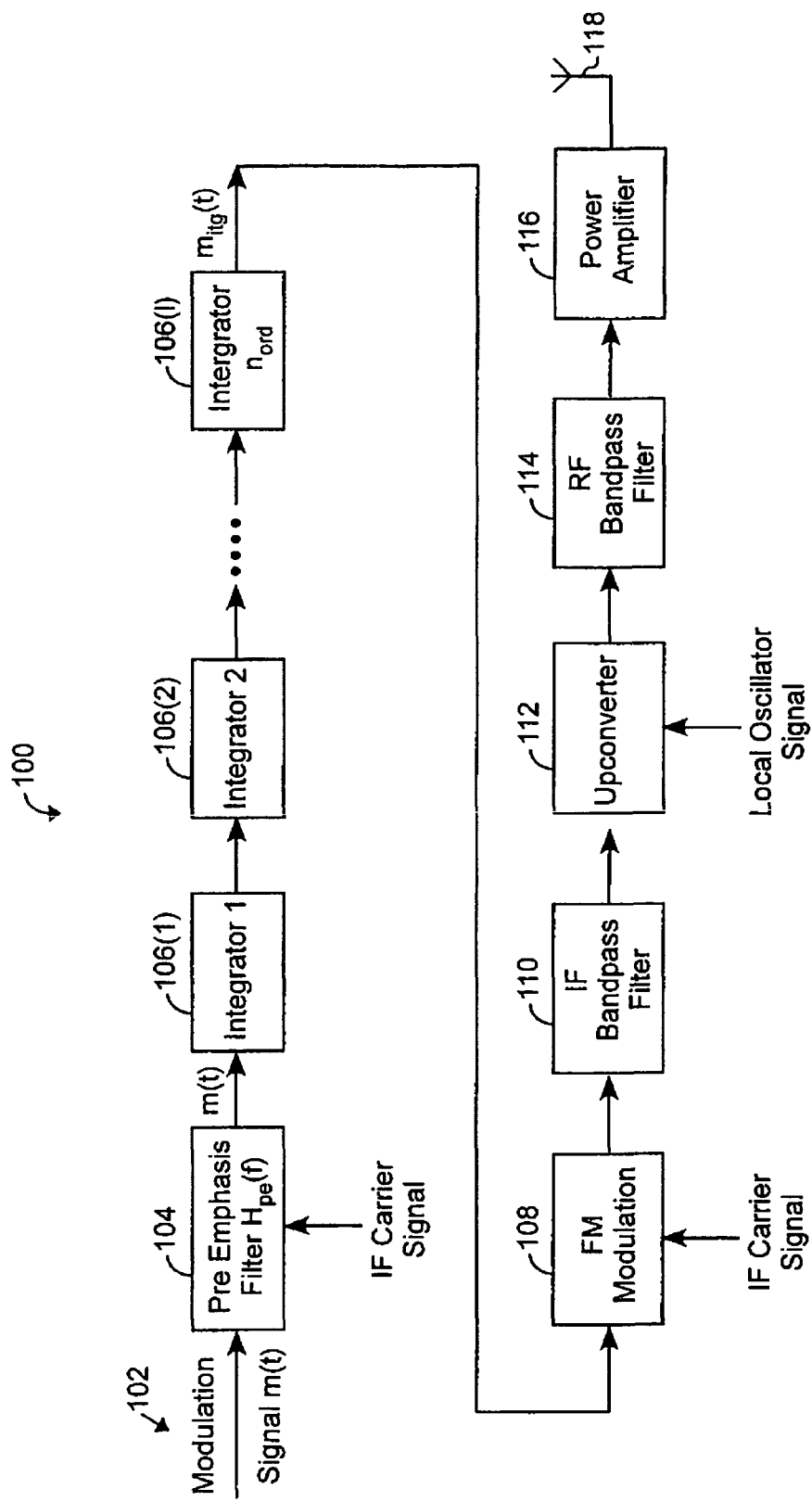
FIG. 1 illustrates a generalized frequency modulation (GFM) transmitter according to one embodiment of the present invention.

FIG. 1 illustrates a generalized FM transmitter 100 according to one embodiment of the present invention. The transmitter 100 may be implemented using any combination of digital and/or analog hardware. For example, in various embodiments, one or more processing steps of the transmitter 100 may be performed digitally by a digital signal processor (DSP) or other suitable digital processing device. The input to the transmitter 100 may be a modulation or information signal 102. The information signal may be filtered by an optional pre-emphasis filter 104. The order of the pre-emphasis filter 104, and thus its frequency response, $H_{pe}(f)$, may be determined based on the order of the transmitter 100.

The output of the pre-emphasis filter 104 may be integrated by a cascaded series of integrators 106(1), 106(2), 106(l). The order of the transmitter 100, shown as $n_{ord}$, is determined based on the number of cascaded integrators 106(1-l) and each integrator 106(1-l) may cause modulation to occur at an additional order above phase. For example, if the transmitter 100 comprises zero integrators 106(1-l), it may transmit in straight FM (i.e., the first derivative of the carrier phase). Likewise, if the transmitter 100 comprises one integrator 106(1-l), it may modulate the information signal at the second derivative of the carrier phase. The output of the cascade of integrators 106(1-l) may be input to an FM modulator 108 that may modulate an intermediate frequency (IF) carrier signal based on the integrated signal output from the last integrator 106(l). Any suitable form of FM modulator may be used by the FM modulator 108. The resulting modulated signal may be up-converted to radio frequency (RF) by up-converter 112. A power amplifier 116 and antenna 118 may transmit the modulated RF signal. It will be appreciated that various band pass filtering may be performed at the IF frequency (such as by IF band pass filter 110) and/or at the RF frequency (such as by RF band pass filter 114).

Figure 2:
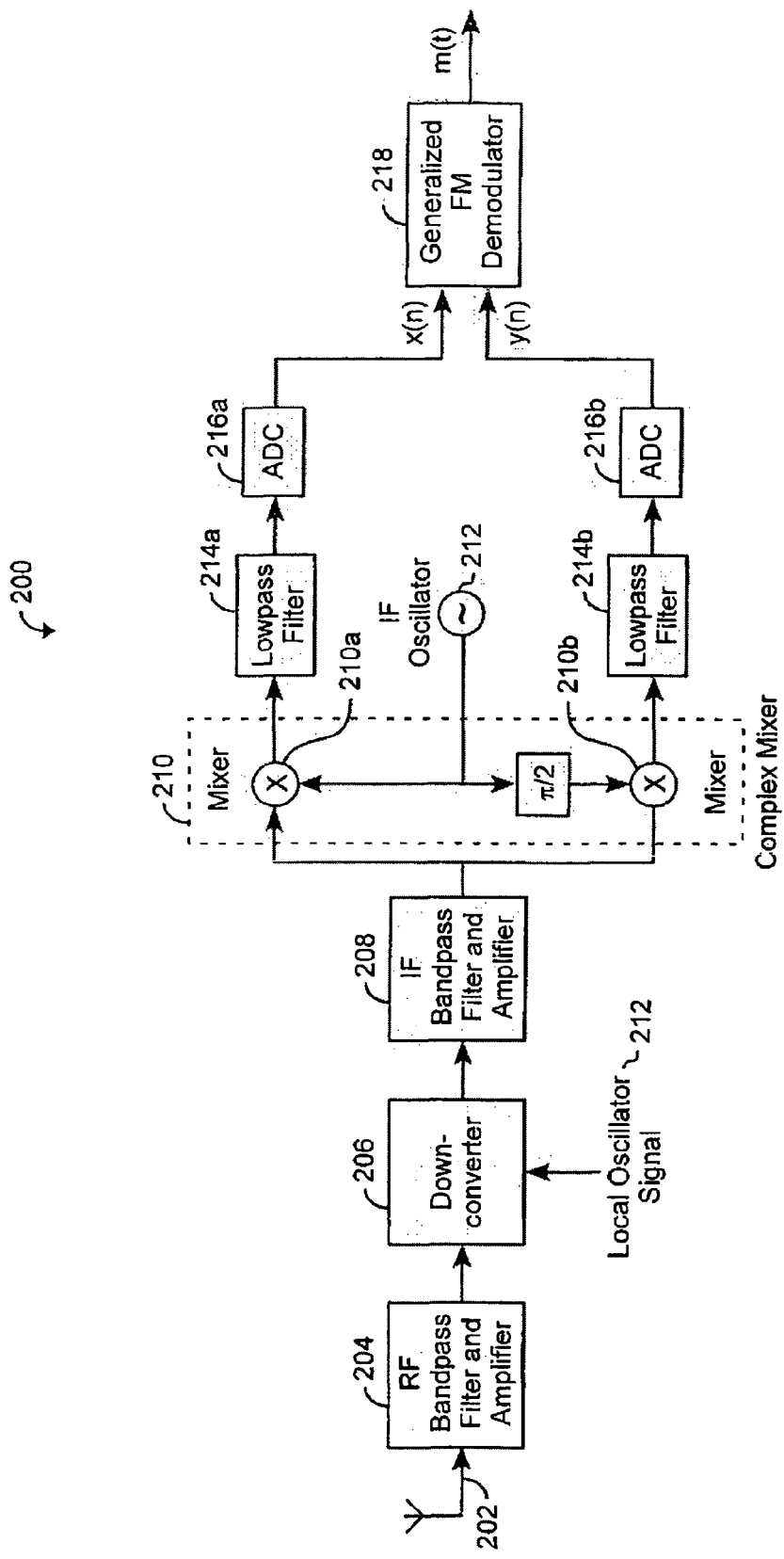
FIG. 2 illustrates a GFM receiver according to one embodiment of the present invention.

FIG. 2 illustrates a generalized frequency modulation (GFM) receiver 200 according to one embodiment of the present invention. Like the transmitter 100, the receiver 200 may be implemented utilizing various analog and/or digital hardware. An antenna 202 may receive the incoming modulated RF signal. An optional RF band pass filter and amplifier stage 204 may amplify the RF modulated signal and filter signal energy outside of the desired RF range. At down-converter 206, the modulated RF signal may be converted to a modulated intermediate frequency (IF) signal. For example, the frequency of the modulated RF signal may be reduced to the IF frequency provided by a local IF oscillator 212. IF band pass filter and amplifier block 208 may perform additional filtering and amplification of the modulated IF signal. For example, the filter/amplifier stage 208 may comprise at least one filter with a center frequency equal to the frequency of the IF oscillator 212.

The output of the filter/amplifier stage 208 may be provided to a complex mixer 210, which may comprise two mixers 210a and 210b. The complex mixer 208 may convert the IF modulated signal to a complex modulated signal. For example, the IF modulated signal from the filter/amplifier stage 208 may be mixed with the output of the IF oscillator 212 by mixer 210a to generate an in-phase component. Also, the IF modulated signal from the filter/amplifier stage 208 may be mixed with the IF oscillator offset by $\pi/2$ by the mixer 210b to generate a quadrature component. The in-phase and quadrature components, respectively, may be low-pass filtered by filters 214a, 214b and converted to digital signals by analog-to-digital converters (ADC's) 216a, 216b. In FIG. 2, the in-phase and quadrature components are represented as x(n) and y(n) respectively, where n represents digital time. That is, n is a discrete variable such that each sample of the ADC's 216a, 216b corresponds to one instance of n. The in-phase and quadrature components may be provided to the generalized FM demodulator 218, which demodulates the digitized signal to the original information signal m(t). It will be appreciated that the position of the ADC's 216a, 216b may be modified based on the digital or analog nature of the various components. For example, although the various filters 204, 208, 214a, 214b, mixers 210a, 210b and down-converter 206 shown in FIG. 2 are prior to the ADC's 216a, 216b and therefore comprised of analog components, any of these components may be implemented digitally, for example, with a digital signal processor (DSP).

FIG. 3 illustrates one embodiment of the generalized frequency modulation demodulator 218 of the receiver of 200. As described above, the inputs to the demodulator 218 comprise the digitized in-phase, x(n), and quadrature, y(n), components of the complex modulated signal. These inputs are provided to cascaded differencers 302(1), 302(2), 302(l). The number of differencers 302(1-l) in the demodulator 218 may be equal to the order of the modulated signal plus one (e.g., $n_{ord}+1$). For example, according to various embodiments, the demodulator 218 may be of order one or two, although higher orders may also be used. The output of each differencer 302(1-l) may be an instantaneous phase difference of the in-phase and quadrature components (e.g., a difference in phase between consecutive digital samples). When the complete cascade of differencers 302(1-l) has been applied, the result may be a complex output signal with an in-phase component u(n) and a quadrature component v(n), where the output signal has an instantaneous phase that varies according to the information signal m(t).

A four quadrant inverse tangent 304 may be applied to the output signal to reconstruct the information signal in terms of digital time, n. Additional processing may then be performed. For example, a digital-to-analog converter (DAC) 306 may convert the information signal m(t) to analog form. If a pre-emphasis filter 104 was applied at modulation, then a corresponding de-emphasis filter 308 may be applied. The frequency response of the de-emphasis filter 308 ($H_{de}(f)$) may be selected to be the inverse of the frequency response of the pre-emphasis filter 104 ($H_{pe}(f)$). It will be appreciated that in embodiments where pre-emphasis and de-emphasis filters are used, the information signal may not be accurately present until after the application of the de-emphasis filter 308. Additional filtering (e.g., low-pass filtering) may also be performed at 310 to remove high frequency artifacts such as, for example, those resulting from the digital to analog conversion.

In one embodiment, the differencers 302(1-l) may be trigonometric differencing blocks. FIG. 4 illustrates a trigonometric differencing block 400 according to one embodiment of the present invention. The inputs to the block 400 are shown as a generic in-phase component, $x_i(n)$, and a generic quadrature component, $y_i(n)$. The outputs are shown as $x_{i+1}(n)$ and $y_{i+1}(n)$. The input $x_i(n)$ is provided to multipliers 402 and 406 as well as to a one cycle delay 410. The output of the one cycle delay 410, which may effectively be $x_i(n-1)$, is provided to multipliers 402 and 404. Similarly, the input $y_i(n)$ is provided to multipliers 404 and 408 as well as to the one cycle delay 411. The output of the delay 411, which may effectively be $y_i(n-1)$ is provided to multipliers 406 and 408. The outputs of multipliers 402 and 408 may be provided to summing junction 414, resulting in $x_{i+1}(n)$. Similarly, the outputs of multipliers 404 and 406 may be provided to summing junction 412, resulting in $y_{i+1}(n)$. In some embodiments, the delay blocks 410, 411 may be configured to delay for more than one cycle, allowing the differencer to find the instantaneous phase difference over non-consecutive samples. This means that the outputs of the delays may effectively be $x_i(n-i)$ and $y_i(n-i)$ where i may be 2 or 3 or more.

Mathematically, the differencing block 400 shown in FIG. 4 may be represented by equations (1) and (2) below:

$$x_{i+1}(n)=x_i(n)x_i(n-1)+y_i(n)y_i(n-1) \tag{1}$$

$$y_{i+1}(n)=y_i(n)x_i(n-1)-x_i(n)y_i(n-1) \tag{2}$$

If the input in-phase component is equal to the cosine of the phase signal and the input quadrature component is equal to the sine of the phase signal, then the outputs of the differencer block 400 are the in-phase and quadrature components of the complex representation of the instantaneous change in phase. This result is illustrated by equations (3)-(8) below, where phase is represented as θ(n):

Given the trigonometric identities of:

$$\sin(a-b) = \sin a \cos b - \cos a \sin b; \text{ and} \quad (3)$$

$$\cos(a-b) = \cos a \cos b + \sin a \sin b \quad (4)$$

If:

$$x_i = \cos(\theta(n)); \text{ and} \quad (5)$$

$$y_i = \sin(\theta(n)) \quad (6)$$

Then:

$$x_{i+1} = \cos(\Delta\theta(n)); \text{ and} \quad (7)$$

$$y_{i+1} = \sin(\Delta\theta(n)) \quad (8)$$

The generalized frequency modulation (GFM) techniques disclosed herein may provide improved noise performance over standard frequency modulation (SFM) techniques. For example, in SFM, the received modulated signal after down conversion to the IF frequency is given by:

$$v_{FM}(t) = A_c \cos\left(2\pi f_{IF} + D_f \int_{-\infty}^{t} m(\tau) d\tau\right) + n(t) \quad (9)$$

where, $A_c$ is the carrier amplitude; $f_{IF}$ is the intermediate frequency; $D_f$ is the FM modulator sensitivity in radi/sec/volt; m(t) is the information signal; and n(t) is the noise with one sided power density equal to $N_o$ watts/Hz. From standard FM theory for relatively high SNR conditions, the pre-demodulated signal $s_o(t)$ is given by:

$$s_o(t) = K\left(\frac{D_f}{2\pi}\right) m(t) \quad (10)$$

where K is a constant. Accordingly, the demodulator output noise $n_o(t)$ is colored with its two-sided power spectral density given by:

$$P_{n_o}(f) = (K/A_c)^2 N_o f^2; |f| \leq B_T/2 \; P_{n_0}(f) = 0; \text{ otherwise} \quad (11)$$

where $B_T$ is the transmission bandwidth. For the case where no pre-emphasis and de-emphasis filters are used, the noise power at the output of the post-demodulation low-pass filter is obtained by integrating $P_{n0}$ as given by equation (11) over the low-pass filter bandwidth $B_a$ and is given by:

$$\overline{n_o^2} = 2\left(\frac{K}{A_c}\right)^2 N_o \frac{B_a^3}{3} \quad (12)$$

From equations (11) and (12), the demodulator output SNR is given as:

$$(S/N)_0 = 3\beta_f^2 \left(\frac{A_c^2}{2N_0 B_a}\right) \overline{m_n^2(t)} = 3\beta_f^2 (S/N)_{bb} \overline{m_n^2(t)} \quad (13)$$

where $(S/N)_0$ is the demodulator output SNR, $(S/N)_{bb}$ is the input SNR in bandwidth $B_a$, and $m_n(t)$ is equal to m(t) divided by the peak value of m(t). Accordingly, $m_n(t)$ is the normalized value of the information signal m(t) with its peak value equal to 1. For the case of a sinusoidal modulation signal, $\overline{m_n^2(t)}$ is equal to 0.5, and thus the SNR is given by:

$$(S/N)_0 = 1.5\beta_f^2 (S/N)_{bb} \quad (14)$$

When a de-emphasis filter is used with a commonly used frequency response given by equation (15), then the output noise may be expressed as shown in equations (16a) and (16b)

$$H_{de}(f) = \frac{1}{\sqrt{[1 + (f/f_1)^2]}} \quad (15)$$

$$\overline{n_{0g}^2} = \int_0^{B_a} 2\left(\frac{K}{A_c}\right)^2 N_0 f^2 \frac{1}{[1 + (f/f_1)^2]} df \quad (16a)$$

$$= 2\left(\frac{K}{A_c}\right)^2 N_0 f_1^3 [(B_a/f_1) - \tan^{-1}(B_a/f_1)] \quad (16b)$$

Because the pre-emphasis and de-emphasis filters are inverse of each other, their effects cancel out on the signal, and therefore, $s_0(t)$ is given by equation (10). The ratio of the SNR at the output with and without pre-emphasis is denoted by $G_{de}$ and the termed de-emphasis gain is given by equation (17):

$$G_{de} \equiv \frac{(S/N)_{0d}}{(S/N)_0} = \frac{1}{3} \frac{(B_a/f_1)^3}{[(B_a/f_1) - \tan^{-1}(B_a/f_1)]} \quad (17)$$

Figure 5:
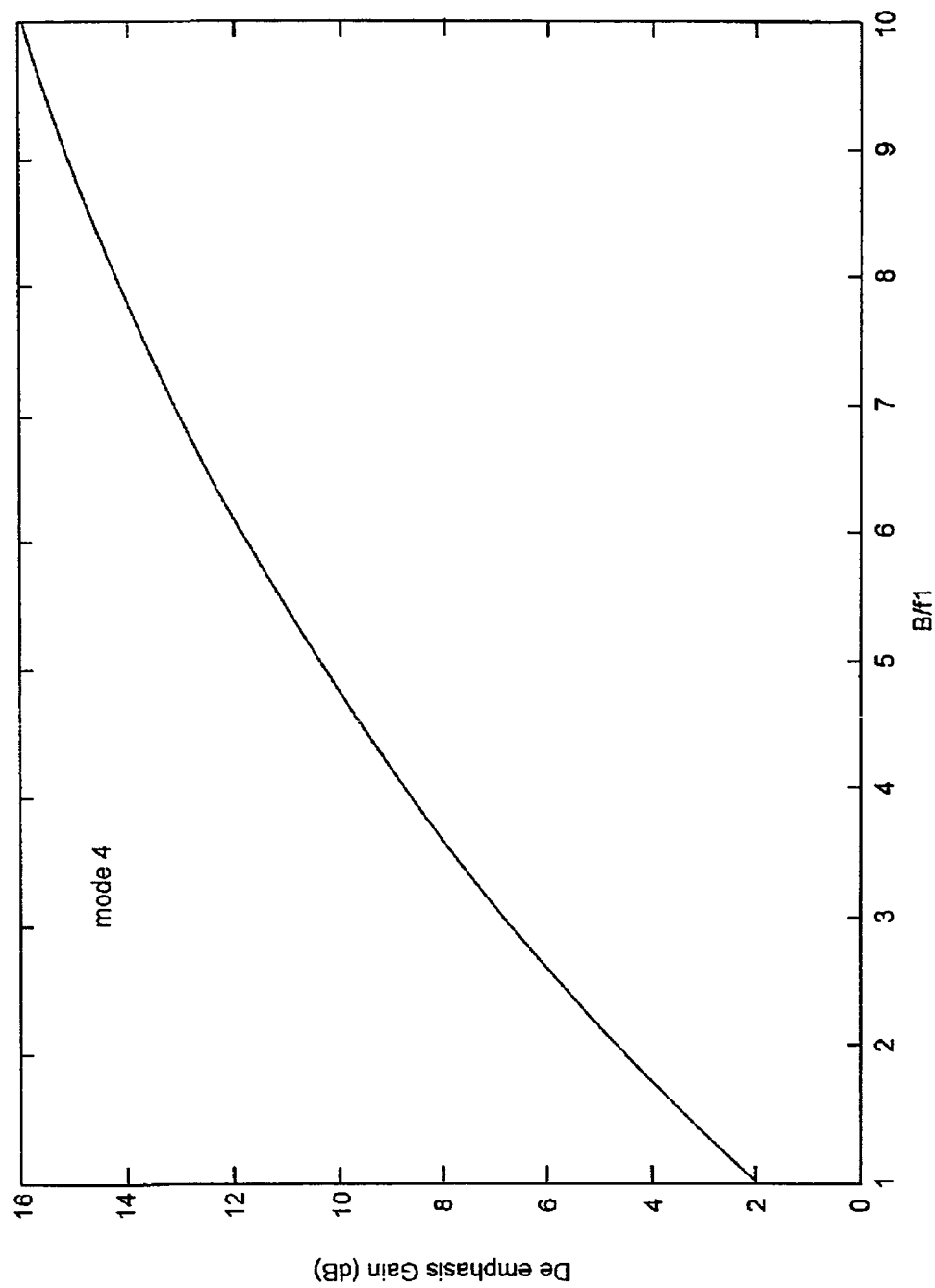
FIG. 5 illustrates a chart showing the de-emphasis gain for standard frequency modulation (SFM) according to one embodiment of the present invention.

FIG. 5 illustrates a chart showing the de-emphasis gain ($G_{de}$) for standard FM as a function of ($B_a/f_1$).

For various embodiments of the GFM techniques disclosed herein, with $n_{ord}$ equal to one, the modulated signal may be given by:

$$v_{GFM}(t) = A_c \cos\left(2\pi f_{IF} t + D_a \int_{\tau=-\infty}^{t} \int_{\xi=-\infty}^{\tau} m(\xi) d\xi d\tau\right) + n(t) \quad (18)$$

Where $D_a$ is a GFM modulator constant. For the case of a sinusoidal signal of the form given by equation (19), the integral term reduces to the form shown in equations (20) and (21):

$$m(t) = V_p \sin(2\pi B_a t) \quad (19)$$

$$m_2(t) = -\beta_a \sin(2\pi B_a t) \quad (20)$$

$$\beta_a = \frac{D_a V_p}{(2\pi B_a)^2} \quad (21)$$

Similar to the definition of the frequency modulation index, the term $\beta_a$ may be referred to as the generalized frequency modulation index. Without pre-emphasis and de-emphasis filters, the signal component of the demodulator output may be given by equation (22) below:

$$s_0(t) = \frac{K_a}{(2\pi)^2} D_a m(t) \quad (22)$$

where the constant $[K_a/(2\pi)^2]$ may be introduced for notational convenience. With the definition of $\beta_a$ given in equation (21), the output signal may be expressed in the following equivalent form:

$$s_0(t) = K_a \beta_a B_a^2 m_n(t) \quad (23)$$

The two-sided power spectral density (PSD) of the noise present in the signal at the DAC output 306 in the GMF demodulator 218 may be expressed as:

$$P_{n0g} = \left(\frac{K_a}{A_c}\right)^2 N_0 f^4 \quad (24)$$

Integration of the PSD given by equation (24) over the bandwidth of the low pass filter 310 may yield the noise power at the demodulator output and is given by:

$$\overline{n_{0g}^2} = \frac{2}{5}\left(\frac{K_a}{A_c}\right)^2 N_0 B_a^5 \quad (25)$$

Accordingly, the output SNR computed from equations (23) and (25) may be given by:

$$(S/N)_{0g} = 5\left(\frac{A_c^2}{2N_0 B_a}\right)\beta_a^2 \overline{m_n^2(t)} \quad (26)$$

Comparing equation (26) with equation (13) showing the SNR for SFM, and setting $\beta_a = \beta_f$ indicates that various embodiments of the GFM scheme disclosed herein may provide a signal-to-noise ratio (SNR) improvement of 2.2 dB when no pre-emphasis/de-emphasis filters are used (e.g., 10 log(2.5/1.5)=2.2 dB).

Greater SNR reduction may be achieved when pre-emphasis/de-emphasis filters are used. Assuming a de-emphasis filter response given by equation (27), the noise power at the output of the GFM demodulator is evaluated by the integral given in equation (28).

$$H_{de}(f) = \frac{1}{\sqrt{[1+(f/f_1)^4]}} \quad (27)$$

$$\overline{n_{0gd}^2} = \int_0^{B_a} \left(\frac{K_a}{A_c}\right)^2 2N_0 \frac{f^4}{[1+(f/f_1)^4]} df \quad (28)$$

Evaluation of the integral of equation (28) may yield the following variance for noise:

$$n_{0gd}^2 = \left(\frac{K_a}{A_C}\right)^2 2N_0 f_1^5 \left[\rho - \frac{1}{4\sqrt{2}}\left\{\ln\left[\frac{\rho^2 + \rho\sqrt{2} + 1}{\rho^2 - \rho\sqrt{2} + 1}\right] + 2\tan^{-1}\left[\frac{\rho\sqrt{2}}{1-\rho^2}\right]\right\}\right] \quad (29)$$

$$\rho = B_a/f_1$$

Accordingly, the inverse of the pre-emphasis gain $G_{gde}$ computed from equations (25) and (29) may be expressed as the following function of $\rho$:

$$G_{gde}^{-1} = \frac{5}{\rho^5}\left[\rho - \frac{1}{4\sqrt{2}}\left\{\ln\left[\frac{(\rho^2 + \rho\sqrt{2} + 1)}{\rho^2 - \rho\sqrt{2} + 1}\right] + 2\tan^{-1}\left[\frac{\rho\sqrt{2}}{1-\rho^2}\right]\right\}\right] \quad (30)$$

Figure 6:
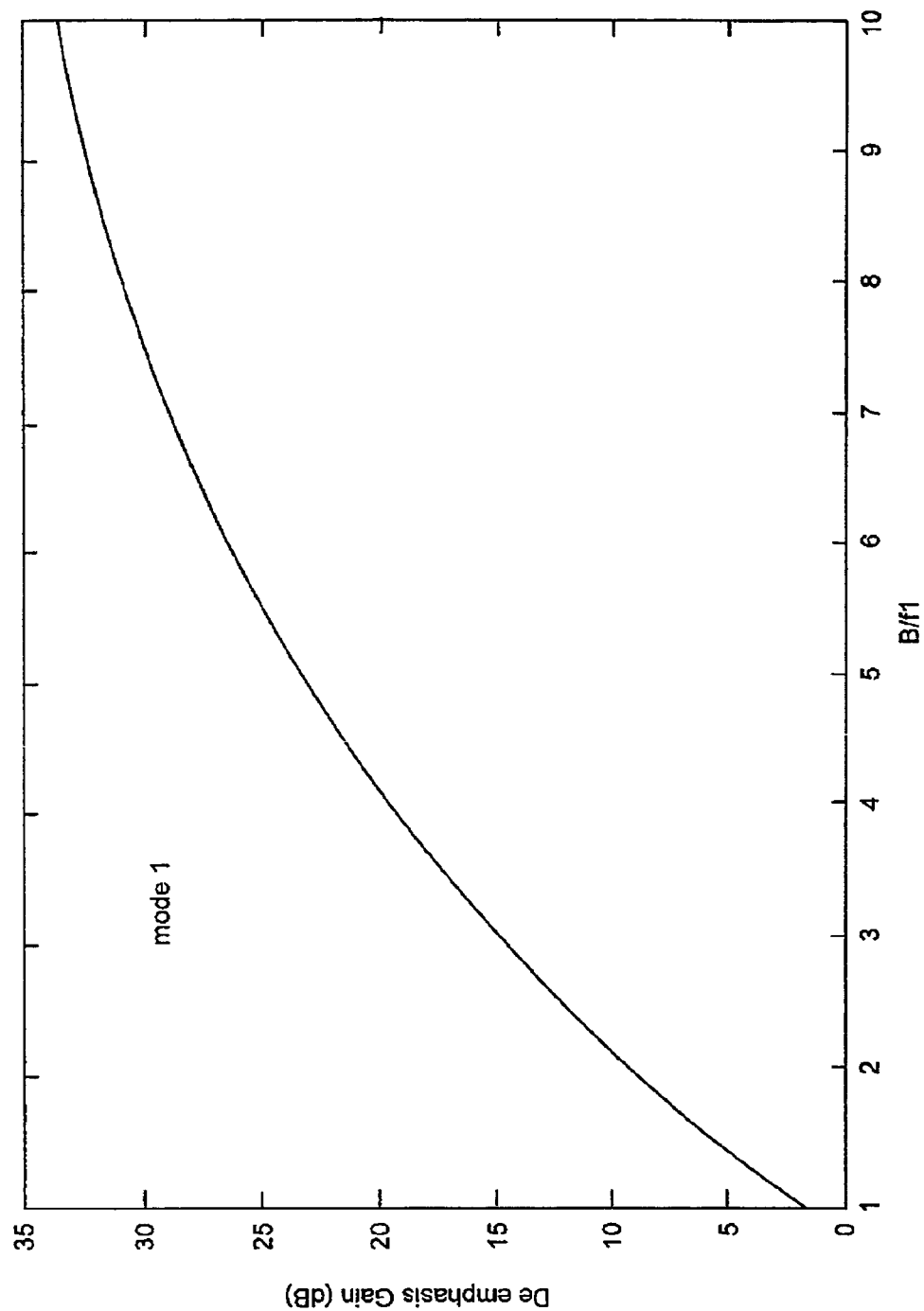
FIG. 6 illustrates a chart showing the de-emphasis gain of GFM according to one embodiment of the present invention.

FIG. 6 is a chart showing the de-emphasis gain, $G_{gde}$, for one embodiment of GFM as a function of $\rho$, for example, as expressed by equation (30). Advantages of certain embodiments of the generalized frequency modulation disclosed herein may be observed by comparing the de-emphasis gain for GFM shown in FIG. 6 with the de-emphasis gain for standard FM, shown in FIG. 5.

For example, with $\rho=B_a/f_1=2$, the GFM de-emphasis gain is 8.6 dB, compared to 4.8 dB for standard FM. Combined with the 2.2 dB advantage without the de-emphasis filter, as illustrated above, this indicates that some embodiments of the disclosed GFM schemes may have an overall advantage of 6 dB over standard FM for $B_a/f_1=2$. This ratio of 2 is approximately equal to the standard value of 1.9 that may be commonly used for the voice signal in telephony. As illustrated by FIGS. 5 and 6, the noise advantage of GFM may increase as the $B_a/f_1$ ratio is increased further.

Various embodiments are directed to a receiver for demodulating an information signal from a modulated signal. The receiver may comprise a complex mixer for converting the modulated signal to a complex modulated signal comprising a first in-phase component and a first quadrature component. The receiver may also comprise a digital demodulator in communication with the complex mixer, which may comprise at least one processor circuit programmed for applying a phase differencer for generating an output function in terms of a phase difference of the complex modulated signal and applying a four quadrant inverse tangent to the output function to generate the information signal. Applying the phase differencer may comprise converting the first in-phase component to a function of a phase difference of the first in-phase component expressed in digital time; and converting the first quadrature component to a function of the phase difference of the first quadrature component expressed in digital time.

In some embodiments, the phase differencer may comprise a plurality of cascaded stages. Each stage may be programmed to convert an input in-phase component to a function of a phase difference of the input in-phase component and to convert an input quadrature component to a phase difference of an input quadrature component. The input in-phase component for the first stage of the plurality of cascaded stages may be the first in-phase component and the output of the last stage of the plurality of cascaded stages may be the output function. For example, the plurality of cascaded stages may comprise two stages.

In some embodiments, the receiver may also comprise a down converter in communication with the complex mixer for shifting the frequency of the modulated signal to an intermediate frequency.

In some embodiments, the receiver may comprise a first analog-to-digital converter for digitizing the first in-phase signal and a second analog-to-digital converter for digitizing the first quadrature signal.

In some embodiments, the function of the phase difference of the first in-phase component expressed in digital time may be given by:

$$x_{i+1}(n)=x_i(n)x_i(n-1)+y_i(n)y_i(n-1)$$

where:
n is digital time;
$x_{i+1}(n)$ is the function of the phase difference of the first in-phase component;
$x_i(n)$ is the in-phase signal; and
$y_i(n)$ is the quadrature signal.

In some embodiments, the function of the phase difference of the first quadrature component expressed in digital time may be given by:

$$y_{i+1}(n)=y_i(n)x_i(n-1)-x_i(n)y_i(n-1)$$

where:
n is digital time;
$y_{i+1}(n)$ is function of the phase difference of the first quadrature component;
$x_i(n)$ is the in-phase signal; and
$y_i(n)$ is the quadrature signal.

In some embodiments, the receiver may also comprise a de-emphasis filter in communication with the digital demodulator for filtering the information signal.

In some embodiments, the receiver may also comprise an antenna in communication with the complex mixer, the antenna for receiving the modulated signal.

Various embodiments are directed to a method of demodulating a modulated signal to obtain an information signal. The method may comprise converting the modulated signal to a complex modulated signal comprising a first in-phase component and a first quadrature component. The method may also comprise generating an output function in terms of a phase difference of the complex modulated signal; and applying a four quadrant inverse tangent to the output function to generate the information signal. Generating the output function may be performed with at least one programmed processor circuit and may comprise converting the first in-phase component to a function of a phase difference of the first in-phase component expressed in digital time. Generating the output function may also comprise converting the first quadrature component to a function of the phase difference of the first quadrature component expressed in digital time.

In some embodiments, generating the output function may also further comprise applying a plurality of cascaded differencer stages. Each stage may be programmed to convert an input in-phase component to a function of a phase difference of the input in-phase component and to convert an input quadrature component to a phase difference of an input quadrature component. The input in-phase component for the first stage of the plurality of cascaded stages may be the first in-phase component. Also, the output of the last stage of the plurality of cascaded stages may be the output function. For example, the plurality of cascaded stages comprises two stages.

In some embodiments, the method may also comprise shifting the frequency of the modulated signal to an intermediate frequency.

In some embodiments, the function of the phase difference of the first in-phase component expressed in digital time may be given by:

$$x_{i+1}(n)=x_i(n)x_i(n-1)+y_i(n)y_i(n-1)$$

where:
n is digital time;
$x_{i+1}(n)$ is the function of the phase difference of the first in-phase component;
$x_i(n)$ is the in-phase signal; and
$y_i(n)$ is the quadrature signal.

In some embodiments, the function of the phase difference of the first quadrature component expressed in digital time may be given by:

$$y_{i+1}(n)=y_i(n)x_i(n-1)-x_i(n)y_i(n-1)$$

where:
n is digital time;
$y_{i+1}(n)$ is function of the phase difference of the first quadrature component;
$x_i(n)$ is the in-phase signal; and
$y_i(n)$ is the quadrature signal.

Various embodiments are directed to a frequency modulation transmitter for generating a modulated signal from an information signal and a carrier signal. The transmitter may comprise an integrator for integrating the information signal with respect to time to generate an integrated information signal. The transmitter may also comprise an FM modulator for generating the modulated signal. The frequency of the modulated signal may correspond to the integrated information signal. In addition, the transmitter may comprise an up-converter and a power amplifier. The up-converter may be for up-converting the modulated signal to the radio frequency (RF) range. The power amplifier may be in electronic communication with an antenna for transmitting the unconverted modulated signal.

In some embodiments, the transmitter may further comprise a pre-emphasis filter for filtering the information signal.

In some embodiments, the integrator may comprise a plurality of cascaded integrator stages for successively integrating the information signal with respect to time.

In some embodiments, the plurality of cascaded integrator stages may consist of two stages.

In some embodiments, at least one of the integrator, the FM modulator and the up-converter may comprise a digital processor circuit.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that at least some of the embodiments described herein may be implemented in many different embodiments of software, firmware, and/or hardware. The software and firmware code may be executed by a computer or computing device comprising a processor (e.g., a DSP or any other similar processing circuit). The processor may be in communication with memory or another computer readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

I claim:

1. A Generalized frequency modulation transmitter configured to generate a modulated signal from an information signal and a carrier signal, the transmitter comprising:
    an integrator configured to integrate the information signal with respect to time to generate an integrated information signal;
    an FM modulator configured to generate the modulated signal wherein a frequency of the modulated signal corresponds to the integrated information signal, and wherein a derivative of the frequency of the modulated signal corresponds to the information signal;
    an up-converter configured to up-convert the modulated signal to the radio frequency (RF) range; and
    a power amplifier in electronic communication with an antenna, the power amplifier configured to transmit the up-converted modulated signal.

2. The transmitter of claim 1, further comprising a pre-emphasis filter configured to filter the information signal.

3. The transmitter of claim 1, wherein the integrator comprises a plurality of cascaded integrator stages arranged in series to successively integrate the information signal with respect to time, and wherein the integrated information signal is an integration of the information signal at an order corresponding to the number of cascaded integrator stages.

4. The transmitter of claim 3, wherein the plurality of cascaded integrator stages consists of two stages.

5. The transmitter of claim 1, wherein at least one of the integrator, the FM modulator and the up-converter comprise a digital processor circuit.

6. The transmitter of claim 1, wherein the generation of the modulated signal comprises:
    generating first and second baseband phase modulated signals on the basis of an integral of the integrated information signal;
    mixing the first baseband phase modulated signal with an in-phase local oscillator signal to generate a first mixed signal;
    mixing the second baseband phase modulated signal quadrature phase local oscillator signal to generate a second mixed signal, wherein the modulated signal is derived from a sum including the first mixed signal and the second mixed signal.

* * * * *